(12) United States Patent
Krishnan

(10) Patent No.: US 9,261,766 B1
(45) Date of Patent: Feb. 16, 2016

(54) TIME MANAGEMENT DISPLAY FOR REFLECTIVE SCREEN

(76) Inventor: Mahadevan Krishnan, Oakland, CA (US)

(*) Notice: Subject to any disclaimer, the term of this patent is extended or adjusted under 35 U.S.C. 154(b) by 656 days.

(21) Appl. No.: 13/416,141

(22) Filed: Mar. 9, 2012

(51) Int. Cl.
*G03B 21/26* (2006.01)

(52) U.S. Cl.
CPC ..................... *G03B 21/26* (2013.01)

(58) Field of Classification Search
CPC ........... G03B 21/26; G09F 9/405; H04N 9/74
USPC ................. 353/36, 69; 348/739–771
See application file for complete search history.

(56) References Cited

U.S. PATENT DOCUMENTS

| | | | | |
|---|---|---|---|---|
| 5,428,417 A * | 6/1995 | Lichtenstein | ................. | 353/122 |
| 2003/0025738 A1 * | 2/2003 | Polgar et al. | .................. | 345/835 |
| 2003/0122863 A1 * | 7/2003 | Dieberger et al. | ............ | 345/730 |
| 2004/0027539 A1 * | 2/2004 | Plunkett | ........................... | 352/90 |
| 2005/0132291 A1 * | 6/2005 | Wagner et al. | ................. | 715/716 |
| 2007/0216876 A1 * | 9/2007 | Narikawa | ......................... | 353/84 |

* cited by examiner

*Primary Examiner* — Sultan Chowdhury
*Assistant Examiner* — Danell L Owens
(74) *Attorney, Agent, or Firm* — File-EE-Patents.com; Jay A. Chesavage

(57) ABSTRACT

An apparatus for the management of time during a visual presentation such as a talk with slides includes an optical emitter surface and focusing assembly for presentation of a progress plot in circular or linear format onto a presentation display shared by a presentation image. A user interface with policies and rules is operative with a controller for an optical emitter to automatically provide and adjust the brightness and contrast level, select optimal regions for placement of the progress image, and generate the optical image which is displayed in superposition with, or adjacent to, the presentation image.

19 Claims, 1 Drawing Sheet

Presentation-interactive Projector

Coordinator projector

Coordinator Projector Progression Images

TIME MANAGEMENT DISPLAY FOR REFLECTIVE SCREEN

FIELD OF THE INVENTION

The present invention relates to a time management device for use by organizers of a conference where a series of speakers presents information in the form of images which are orally described during substantially fixed time intervals. In particular, the invention relates to a display device for indicating the remaining interval time to a presenter who is using images as a primary component of the presentation.

BACKGROUND OF THE INVENTION

In conference settings where a speaker is presenting an informational lecture or talk accompanied by visual slides or presentation materials, the speaker's attention is often directed to the presentation materials projected on a screen behind the presenter, and the presenter is further distracted by the process of fully describing the details contained in the images being presented, which usually appear in outline form in the presentation materials, or occasionally with visual detail the speaker uses as a prompt to describe the various aspects of the presentation which is present in the projected image. The expansion of concepts shown in the slides into the spoken comments of the presentation can consume greatly varying intervals of time from presentation to presentation, as the same set of images may be used in a range of presentations to different audiences. In a presentation to an audience of generalists, many details may be omitted in favor of general concepts, whereas when the presentation is delivered to an audience of peers or other specialists, additional details may be described at great length. This presents a challenge to the organizer of a conference who is responsible for keeping the conference program on a timely schedule, which is typically accomplished by allocating a fixed interval of time for each presenter, optionally with an additional increment of time allocated for interactive questions and answers with the speaker. It is a commonplace occurrence at a research conference for a researcher to become emotionally invested in describing the work he or she has been advancing over the course of the months or years, and during delivery of the talk become quite caught up in the excitement of the discovery being presented, or in describing details of an intricate aspect which may be of special interest to a particular audience, causing the presenter to completely lose track of time.

In one prior art system, a light panel with a green lamp, yellow lamp, and red lamp are placed on the podium, but a speaker who is wrapped up in his or her presentation often becomes oblivious to these visual warnings, particularly when facing the presentation screen while using a laser pointer to highlight regions of the slide being presented, which places the warning light panel at the presenter's back and out of visual range.

In another prior art device, a visual indication is incorporated into the projector system using software. A problem arises in this type of system where the projector is provided by the facility, and the projector operates as a video peripheral with the video interface connected to the presenter's laptop or portable computer which contains the presentation but may not have time management software installed. A similar problem arises where the presenter is using transparencies or other media which are projected onto a reflective screen for viewing, for which no computer or display peripheral may be in use by the presenter.

It is desired to provide a visual indication of time remaining in a presentation, or track the progress in the presentation, using an apparatus which does not rely on the use of a particular software installed on the presenter's computer, is under the conference organizer's control, and is visible to the presenter by appearing directly on the screen that displays his or her presentation.

OBJECTS OF THE INVENTION

A first object of this invention is a device for projecting an indication of progress and remaining time onto a reflective screen.

A second object of the invention is a device for periodically measuring the reflected light from a region of a reflective screen, determining an appropriate illumination level for the region of the screen, and projecting an indication of progress and remaining time onto the region.

A third object of the invention is a device for projecting an indication of progress including a series of time-related warnings onto the region of a screen, where the time-related warnings may include the color or image size of a region receiving a projected image, where the projected image which may change color or size to indicate an increased warning level.

SUMMARY OF THE INVENTION

In one embodiment of the invention, an indication of progress is projected onto a reflective screen alongside an existing presentation image, with the indication of progress including at least one of: a linear bar graph, a circular bar graph, a colored image corresponding to a warning level, or an elapsed or remaining time indication.

In another embodiment of the invention, a display of progress is projected onto a region of reflective screen after measuring the intensity of the region.

In another embodiment of the invention, a display of progress is projected onto a region of reflective screen, where the indication of progress further displays a warning level by changing image size or color.

In another embodiment of the invention, a display of progress is projected into one of several possible regions of a reflective screen after comparing the possible regions based on presentation image brightness.

DETAILED DESCRIPTION OF THE INVENTION

Figure 1:
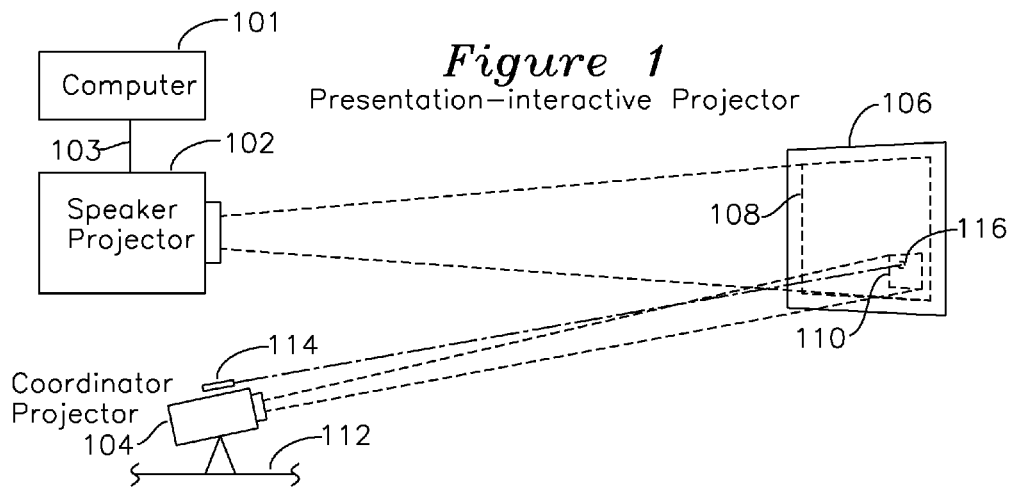
FIG. 1 shows the block diagram of a coordinator projector used in combination with a speaker projector.

FIG. 1 shows a computer 101 which contains presentation slides, the computer 101 coupled through a video link 103 to a speaker projector 102 displaying images of a presentation onto a screen 106 in a sub-region presentation image 108, as is known in the prior art of presentation display hardware. A portable coordinator projector 104 rests on a surface 112 and projects a secondary image 110 onto presentation image 108. Secondary image 110 contains information for a speaker to determine whether his/her pace of presentation is within the parameters established by coordinator projector 104, and secondary image 110 may be projected onto any part of the screen, as required for optimum viewing contrast. As will be described later, coordinator projector 104 may include an external detector 114 for measurement of the pre-existent image intensity of presentation image 108 in a region 116, or the image detector may be integrated with, or aside from, the optical emitter 206 of FIG. 2.

Figure 2:
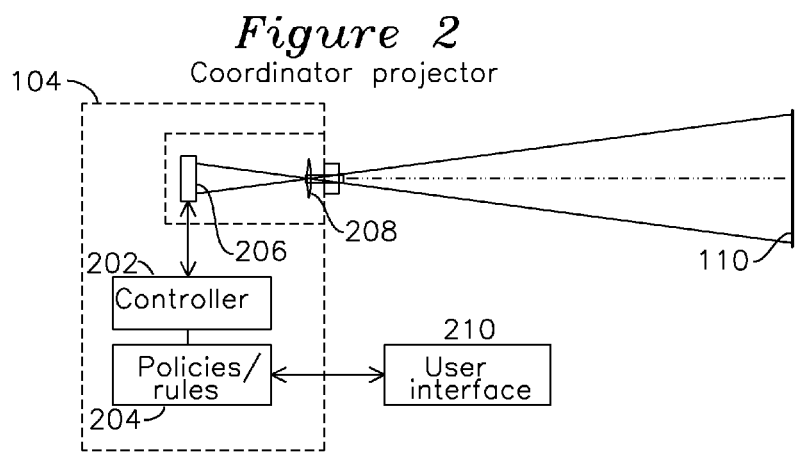
FIG. 2 shows the block diagram of a coordinator projector.

FIG. 2 shows coordinator projector 104, which includes optical emitter 206, focus lens 208, and projects the image from optical emitter 206 onto remote screen region 110 of FIG. 1. The optical emitter 206 has regions which are enabled to form luminescent images of sufficient brightness to be visible on screen region 110 between subsequent presentation slide projections onto or adjacent to presentation image region 108 as determined by controller 202, which also interprets policies and rules 204 as provided by a user interface 210 which may optionally be replaced with a wireless link and web interface for control of the coordinator projector 104, thereby allowing physical separation between the coordinator projector 104 and user interface 210. In one embodiment of the invention, the optical emitter 206 generates a linear graph of time progress based on a fixed interval of time which is subdivided into presentation time and interactive question time. In another embodiment of the invention, the optical emitter 206 generates a circular graph of time progress based on a fixed interval of time. In another embodiment of the invention, the optical emitter 206 generates a circular graph of time with a central or outer region for the indication of progress against a metric, or alternatively for warning of slow progress or warning of limited remaining time.

Figure 3:
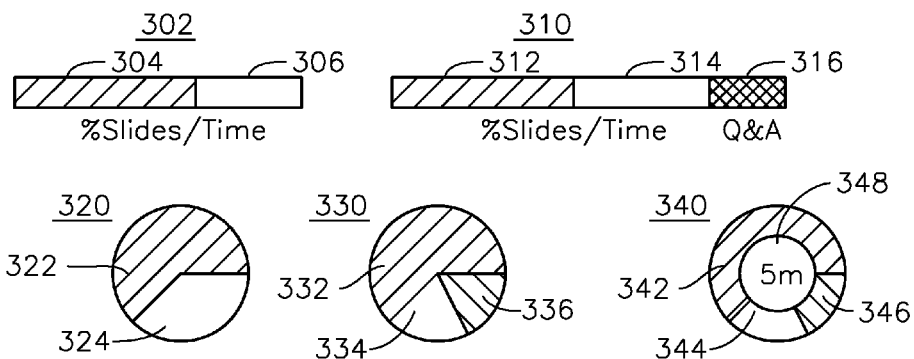
FIG. 3 shows a variety of images projected by a coordinator projector for providing time management information of a fixed interval of time during a presentation.

FIG. 3 shows various examples of the display of presentation progress as a variety of different progression symbols which are formed after comparison of progress to a metric such as: the passage of elapsed time compared to allocated time; percentage of slides covered compared to the percentage of presentation time used; a remaining time displayed numerically; or any suitable metric for providing feedback to a presenter which allows the presenter to modify the pace or level of detail of the talk. Where the presenter submits the total number of slides and the organizer has allotted a presentation time, time management graph 302 shows a linear progression with bar 304 indicating elapsed time and bar 306 indicating time remaining. Time management graph 310 for shows a percentage of slides presented as elapsed presentation time bar 312, remaining presentation slides as bar 314, and question and answer time bar 316. Alternatively, the graphs of 302 and 310 may represent time only. Circular graph 320 shows elapsed presentation time 322 and remaining presentation time 324, and circular graph 330 shows elapsed presentation time region 332, remaining presentation time region 334, and question and answer time 336. Graph 340 operates as shown in 330, with an additional region 348, which may be circular or any other shape, for use in indicating a numerical time, or an increasingly visible warning which may change color or grow in diameter or intensity to further highlight to the presenter that the presentation time or question and answer time has come to a close. Each of the regions of the progression symbols shown in FIG. 3 may be provided in a distinguishing color or grey scale, which color or grey scale may be selected using the optical measurement of the existent image, to provide best contrast with the existent image 108 of FIG. 1. Sampling region 116 of FIG. 1 is shown as small region, however it may include an extent which encompasses the entire progression symbol, or it may be an adjacent region, or a proposed region for use at a subsequent time. Sampling of the region 116 may be done by briefly disabling the coordinator projector optical emitter 206 during the optical detection interval.

In another embodiment of the invention, the optical emitter 206 includes a photo detector region which measures the incident light level on reflective surface 110 during a first interval prior to illumination by optical emitter 206, and accordingly adjusts the level of optical emitter 206 during a projection interval to provide a suitable contrast level with the presentation image present in the display screen, or alternatively uses a gimbal system coupled to the assemblage of optical emitter 206 and lens 208 to provide for manual or automatic re-pointing of the region 110 of FIG. 1 into a different region of screen 106 selected by the projector 104 through a "dark field" measurement of the available regions of display area 108, or by manual movement by the coordinator using user interface 210. Gimbal mounted x-y control of sensor and lens assemblies for pointing of an image into a region is well known in the prior art, and the "dark field" measurement may taken by a sensor inside or outside the extent of optical emitter 206, preferably made during an interval when optical emitter 206 is not enabled. Accordingly, the photo detector measures incident light levels on different regions of the presentation surface, selects one of these regions for display, points the optical emitter 206 and lens 208 toward that region, and selects an optical emitter 206 intensity level to display the progress indication at a suitable brightness level co-existent with the presenter's slide brightness level, or the progress indication may be placed outside a region which is brightly illuminated by the presentation image. In another embodiment of the invention, the coordinator projector utilizes a region outside but near the boundary of the presentation area 108 extent shown in FIG. 1.

I claim:

1. A progress indication system for projected images from a presenter projector onto a presentation surface, the presenter projector images having an extent area, the progress indication system having:
    a coordinator projector separate from said presenter projector and generating optical energy from an optical emitter and projecting said optical energy through a lens and onto a region of said extent area of said projected images;
    said optical emitter coupled to a controller for generating an progression symbol based on a set of policies;
    a user interface coupled to said controller;
    where at least one said policy and an elapsed time provides for the generation of a progression symbol indicating at least one of:
    the time consumed or slides presented;
    time remaining or slides remaining;
    a post-presentation indication;
    where said optical emitter and said lens include a re-pointing mechanism for the movement of said region of said extent area containing said progression symbol to a different region of said presentation surface.

2. The progress indication system of claim 1 where said time consumed or slides presented symbol is a linear bar having a first color.

3. The progress indication system of claim 2 where said time remaining or slides remaining symbol is a linear bar having a second color distinguishable from said first color.

4. The progress indication system of claim 3 where said post-presentation indication is a linear bar having a third color distinguishable from said first color or said second color.

5. The progress indication system of claim 1 where said time consumed or slides presented symbol shows an included angle of a circle to indicate progress.

6. The progress indication system of claim 1 where said time remaining or slides remaining shows an included angle of a circle to indicate progress.

7. The progress indication system of claim 5 or 6 where said circle includes a central region for display of a warning symbol.

8. The progress indication system of claim 1 where said repointing mechanism periodically selects a new region of said extent area during a measurement interval, said new region selection based on a darkest luminosity, said repointing system placing said progression symbol in said new region during an interval which follows said measurement interval.

9. The progress indication system of claim 1 where said user interface provides for the entry of at least one of: a number of presentation slides, a time interval for a presentation, a type of progression symbol to be projected, and a post-presentation interval and associated symbol.

10. The progress indication system of claim 1 where said progression symbols are projected within said presentation surface.

11. The progress indication system of claim 1 where said progression symbols are projected outside the boundary of said extent area.

12. The progress indication system of claim 1 where said movement of said region of said extent area containing said progression symbol over said presentation surface can be performed using said user interface.

13. The progress indication system of claim 1 where said user interface is coupled to said controller using a wireless interface.

14. A coordinator projector having:
an optical emitter and a lens for forming a progression symbol onto a presentation surface having a pre-existent image;
an optical detector for determining an illumination intensity of said pre-existent image during a first interval when said optical emitter is not enabled, said illumination intensity of said pre-existent image used to determine an intensity of said optical emitter;
said progress indication projected onto said pre-existent image during a second interval which is exclusive from said first interval and thereby providing an elapsed time and a remaining time in the form of a progression symbol;
said first interval illumination intensity measurement performed when a change in illumination intensity of said presentation projector image occurs;
and where said optical emitter and said lens include a re-pointing mechanism for the movement of said progression symbol to a different region of said presentation surface.

15. The progress indication system of claim 14 where said progression symbol is a circular or linear bar graph.

16. The progress indication system of claim 15 where said circular or linear bar graph includes a number of slides completed and a number of slides remaining.

17. The progress indication system of claim 14 where said progression symbol includes an indication of time consumed and time remaining.

18. The progress indication system of claim 14 where said optical detector is in the optical path of said optical emitter.

19. The progress indication system of claim 14 where said optical detector has a separate optical path from said optical emitter.

* * * * *